United States Patent [19]
Mochizuki

[11] Patent Number: 5,269,243
[45] Date of Patent: Dec. 14, 1993

[54] FUEL INJECTED ENGINE

[75] Inventor: Norihisa Mochizuki, Iwata, Japan

[73] Assignee: Yamaha Hatsudoki Kabushiki Kaisha, Iwata, Japan

[21] Appl. No.: 783,238

[22] Filed: Oct. 28, 1991

[30] Foreign Application Priority Data

Nov. 28, 1990 [JP] Japan .................................. 2-331107

[51] Int. Cl.$^5$ ............................................. F01P 11/00
[52] U.S. Cl. ............................... 123/41.55; 123/41.51; 123/305; 123/310; 180/229
[58] Field of Search ............... 123/41.51, 41.55, 41.31, 123/41.33, 41.72, 41.82 R, 73 A, 73 AF, 169 C, 305, 310; 180/229

[56] References Cited

U.S. PATENT DOCUMENTS 4,799,569  1/1989  Hattori et al. ...................... 180/229

FOREIGN PATENT DOCUMENTS 879926  3/1943  Fed. Rep. of Germany ...... 123/310
58-96130  6/1983  Japan .................................. 123/310

Primary Examiner—Noah P. Kamen
Attorney, Agent, or Firm—Ernest A. Beutler

[57] ABSTRACT

A motorcycle powered by a two cycle crankcase compression fuel injected internal combustion engine. The injection system for the engine includes a main fuel air/injector that injects fuel directly into the combustion chamber and a second or auxiliary fuel injector that injects fuel into the induction system for the engine. Control means control the fuel injectors so that the second or auxiliary fuel injector supplies fuel only during starting and high load, high speed conditions. The engine components are laid out in such a way that the spark plugs of the engine and the fuel injector will each be exposed to unobstructed air flow for cooling.

18 Claims, 6 Drawing Sheets

FUEL INJECTED ENGINE

BACKGROUND OF THE INVENTION

This invention relates to a fuel injected engine and more particularly to a layout for the components of a fuel injected engine that provide adequate cooling of all the components of the engine which are mounted in the cylinder head.

As a means of providing improved fuel efficiency and the control of unwanted gas emissions, direct cylinder injection is being considered. One form of direct cylinder injector includes an injection valve that is controlled by an electrically operated solenoid. Such electrically operated injection valves, however, generate a fair amount of heat due to the electrical energy expended in opening and closing the injection valve. In order to further improve combustion, it has been proposed to employ multiple spark plugs for an engine. Where multiple spark plugs and a fuel injector having a solenoid operator are all mounted in the cylinder head of the engine, certain problems can arise.

In addition to the mere problem of placement of the components, the positioning of both a fuel injector and a spark plug in the cylinder head of the engine can give rise to cooling problems. That is, the spark plug and fuel injector are normally cooled merely by the air flow across the engine. However, if these components are both mounted in the cylinder head, the placement of one is likely to interfere with the cooling air flow across the other.

It is, therefore, a principal object of this invention to provide an improved cylinder head assembly for a fuel injected engine.

It is a further object of this invention to provide an improved cylinder head, spark plug and fuel injector arrangement for an engine that will insure adequate cooling without any component interfering with the air flow across the other components.

SUMMARY OF THE INVENTION

This feature is adapted to be embodied in an internal combustion engine for powering a motor vehicle having an engine area in which the engine is positioned and through which air flows in a normal direction. The engine has a cylinder head with a spark plug mounted in the cylinder head for firing a charge in a combustion chamber of the engine. A fuel injector is also mounted in the cylinder head for delivering fuel to the combustion chamber. The fuel injector and spark plug are mounted so that the air flowing through the engine area passes substantially unobstructed across each of the spark plug and the fuel injector without the flow across one interfering with the flow across the other.

DETAILED DESCRIPTION OF THE PREFERRED EMBODIMENT OF THE INVENTION

Figure 1:
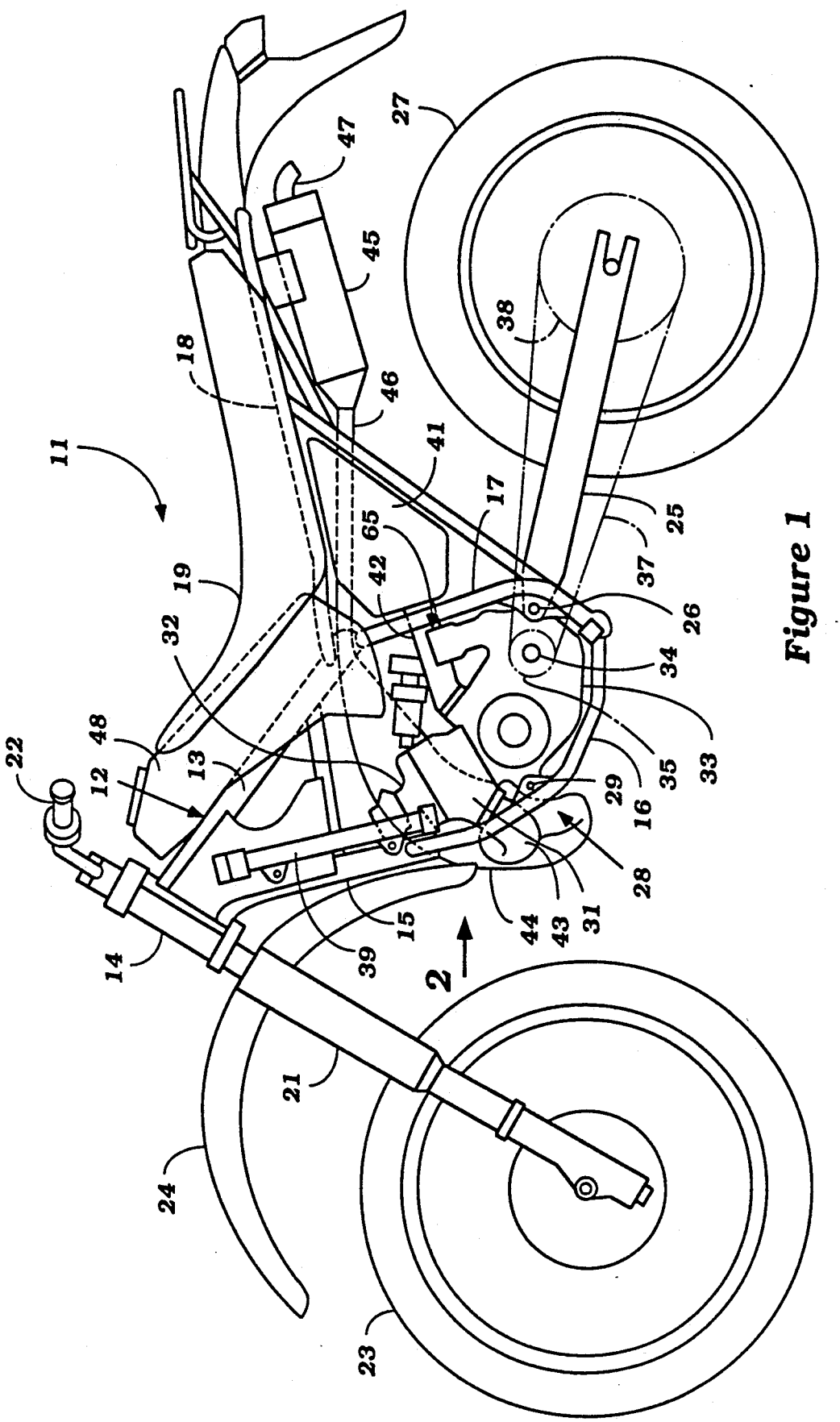
FIG. 1 is a side elevational view of a motorcycle powered by an internal combustion engine constructed in accordance with an embodiment of the invention.

Referring now in detail to the drawings and first initially to FIG. 1, a motorcycle powered by an internal combustion engine constructed in accordance with an embodiment of the invention is depicted and is identified generally by the reference numeral 11. Although the invention has utility in conjunction with other applications for internal combustion engines, it has particular utility in conjunction with motorcycles since such vehicles normally require a compact high power output engine and are the type of vehicle commonly powered by two cycle crankcase compression internal combustion engines. It will be obvious to those skilled in the art that the invention has particular utility in conjunction with the powering of motor vehicles and particularly certain features have application with vehicles wherein the powering engine is positioned in an area where cooling air flows across it.

The motorcycle 11 is comprised of a frame assembly, indicated generally by the reference numeral 12 which may be of any known type and is depicted as being of a welded construction having a pair of main frame members 13 that diverge downwardly and rearwardly from a head pipe 14. Down tubes 15 are fixed to the head pipe 14 and main frame members 13 and extend downwardly and terminate at a cradle portion 16. Further tubes 17 extend between the lower rear portions of the tubes 16 and the rear portions of the main frame members 13. Seat rails 18 are connected to the main frame members 13 and carry a seat 19 that is designed to accommodate a rider.

The head tube 14 journals a front fork assembly 21 which is steered by a handlebar 22 and which rotatably journals a front wheel 23 at its lower end. The front fork assembly 21 may include any type of suspension arrangement and also carries a front fender 24 that overlies the front wheel 23.

A trailing arm assembly 25 has a pivotal connection 26 at its forward end to the frame assembly 12. A rear wheel 27 is rotatably journaled at the rear end of the trailing arm 25 and a suitable suspension element (not shown) is provided between the trailing arm 25 and the frame assembly 12 for controlling the movement of the rear wheel 27 relative to the frame 12 in a known manner.

An internal combustion engine, indicated generally by the reference numeral 28, is supported in the frame assembly 12 in a known manner, by means of a plurality of engine supports, one of which is indicated by the reference numeral 29. The engine 28 is a two-stroke crankcase compression internal combustion engine and, in the illustrated embodiment, includes a cylinder block 31 that is inclined generally forwardly and in which one cylinder bore, to be described, is provided. Although the invention is described in conjunction with a single cylinder engine, it should be readily apparent to those skilled in the art how the invention can be employed with multiple cylinder engines. A cylinder head 32 is affixed to the cylinder block 31 in a known manner.

The engine 28 also includes a crankcase assembly 33 that is fixed to the lower end of the cylinder block 31 and, as is conventional in motorcycle practice,, contains a change speed transmission having an output shaft 34 to which a sprocket 35 is affixed. A chain 37 encircles the sprocket 35 and is driven by it. The chain 37 is entrained around a sprocket 38 affixed to the rear wheel 27 in a known manner for driving this rear wheel.

The engine 28 is water cooled and there are provided a pair of radiators 39 that are mounted on opposite sides of the down tubes 15 and through which liquid coolant is circulated in a manner to be described.

The engine 28 is provided with an induction system that includes an air intake device 41 positioned rearwardly of the engine 28 within the frame 12 and which supplies an inlet duct or manifold 42.

The engine 28 has a forwardly facing exhaust port to which an exhaust pipe 43 is affixed and which exhaust pipe extends around the side of the engine and defines an expansion chamber 44 that communicates with a muffler 45 through a tail pipe 46. The muffler 45 silences and discharges the exhaust gases to the atmosphere through an outlet 47.

A fuel tank 48 is mounted on the main frame members 13 forwardly of the seat 19 and supplies fuel to the engine 28 in a manner which will now be described by primary reference to the remaining figures.

Referring now primarily to FIGS. 2-6, the construction of the internal combustion engine 28 will be described. It should be understood that, except that hereinafter will be noted, the engine 28 is generally conventional in construction and, for that reason, components which are conventional will not be described, except insofar as is necessary to understand their relationship to the invention.

Figure 3:
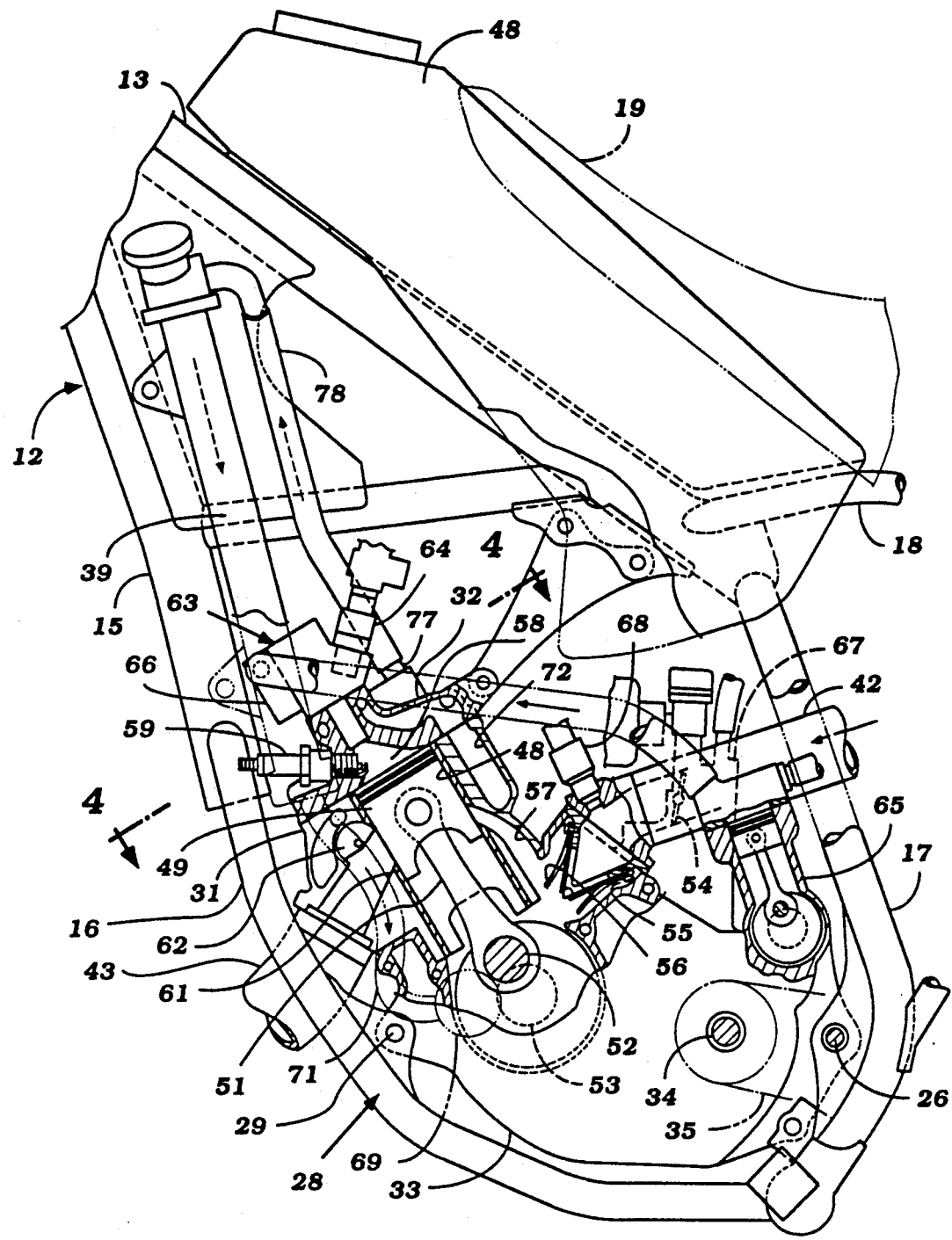
FIG. 3 is a side elevational view, looking from the same direction as FIG. 1, on an enlarged scale and shows the engine, with portions broken away.
Figure 5:
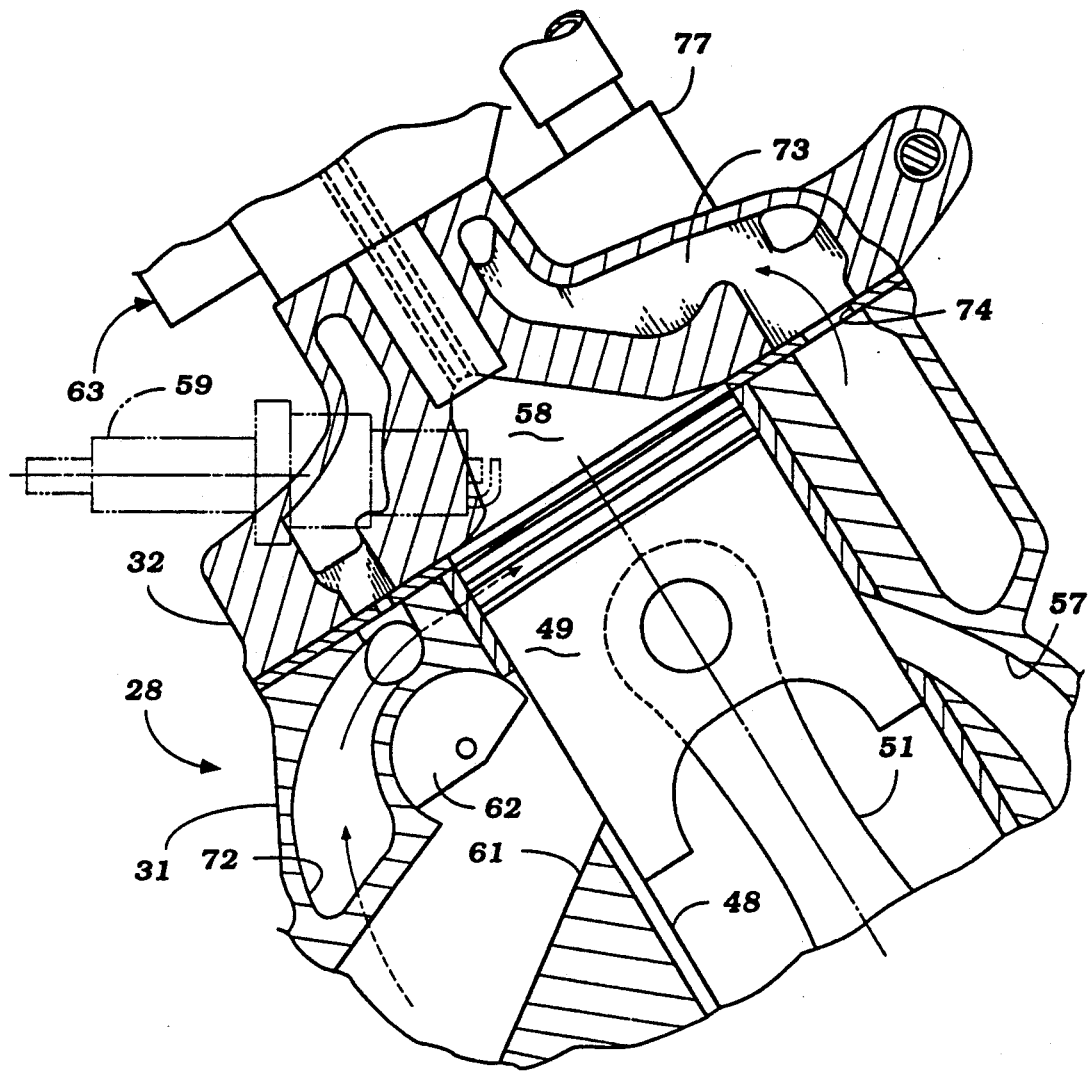
FIG. 5 is a cross sectional view taken along the line 5—5 of FIG. 4.
Figure 6:
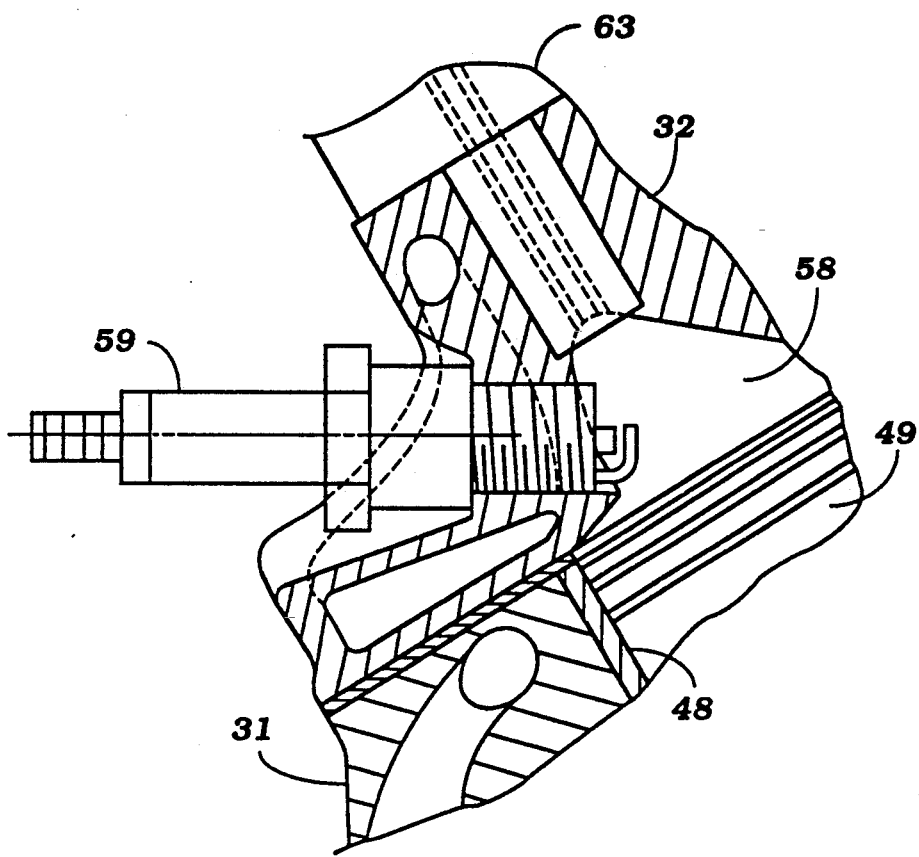
FIG. 6 is a cross sectional view taken along the line 6—6 of FIG. 4.

As has been noted, the cylinder block 31 is forwardly inclined and defines a single cylinder bore, this cylinder bore being shown in FIGS. 3, 5 and 6 and is indicated generally by the reference numeral 48, being formed by a liner inserted into the cylinder block 31. A piston 49 reciprocates within the cylinder bore 48 and is connected by means of a connecting rod 51 to a throw 52 of a crankshaft 53 that is journaled in the crankcase assembly 33 in a known manner.

As has been previously noted, an intake air charge is supplied to the engine from the air inlet device 41 and intake manifold 42. The intake manifold 42 has positioned within it a throttle valve 54 for controlling the engine speed and the communication of the intake manifold 42 with an intake port 55 formed in the crankcase 33. A reed type check valve 56 is positioned in the intake port 55 for permitting flow into the crankcase chamber but precluding reverse flow.

Figure 2:
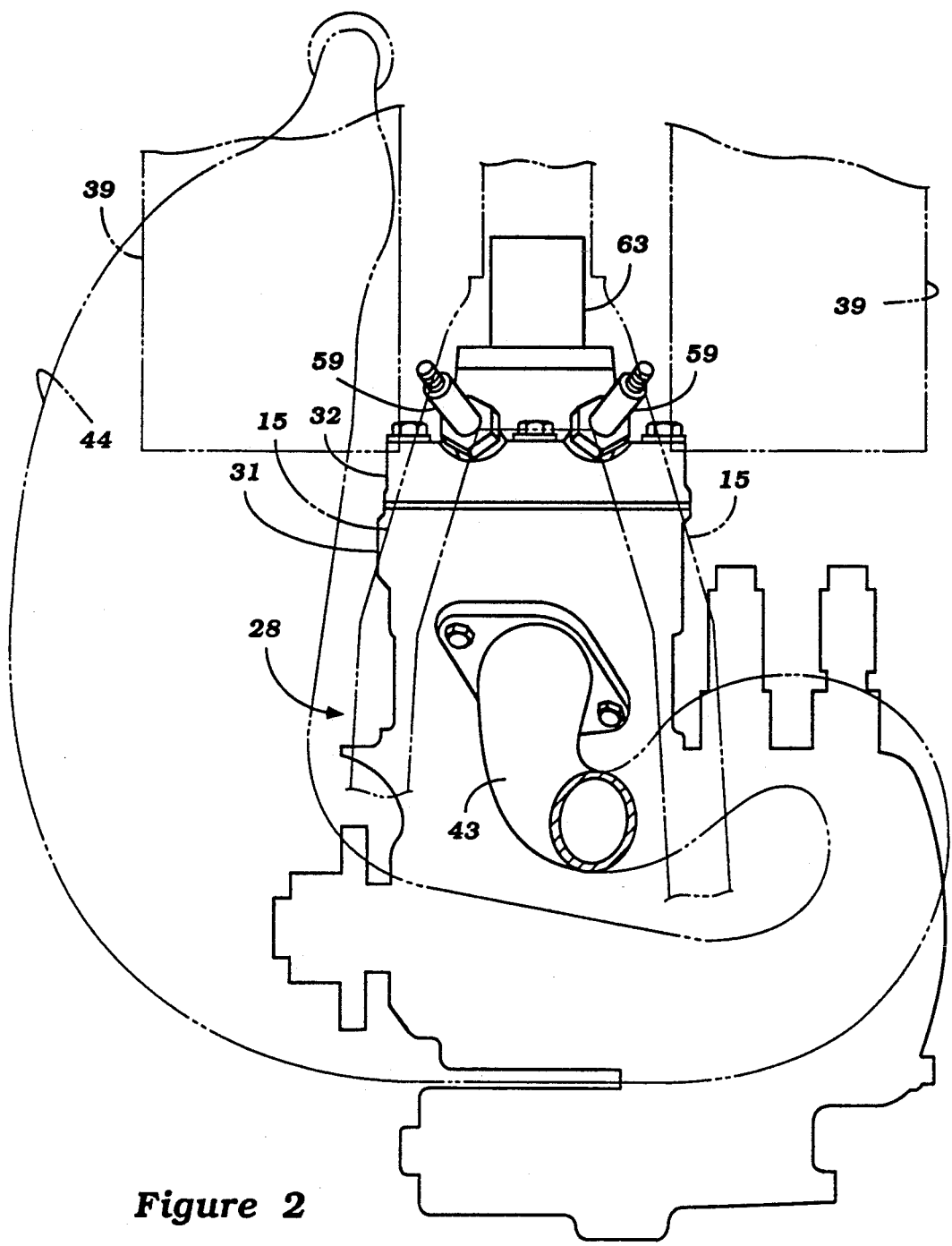
FIG. 2 is an elevational view looking in the direction of the arrow 2 in FIG. 1, with certain components of the engine broken away and with the components of the motorcycle as part from the engine shown in phantom.
Figure 4:
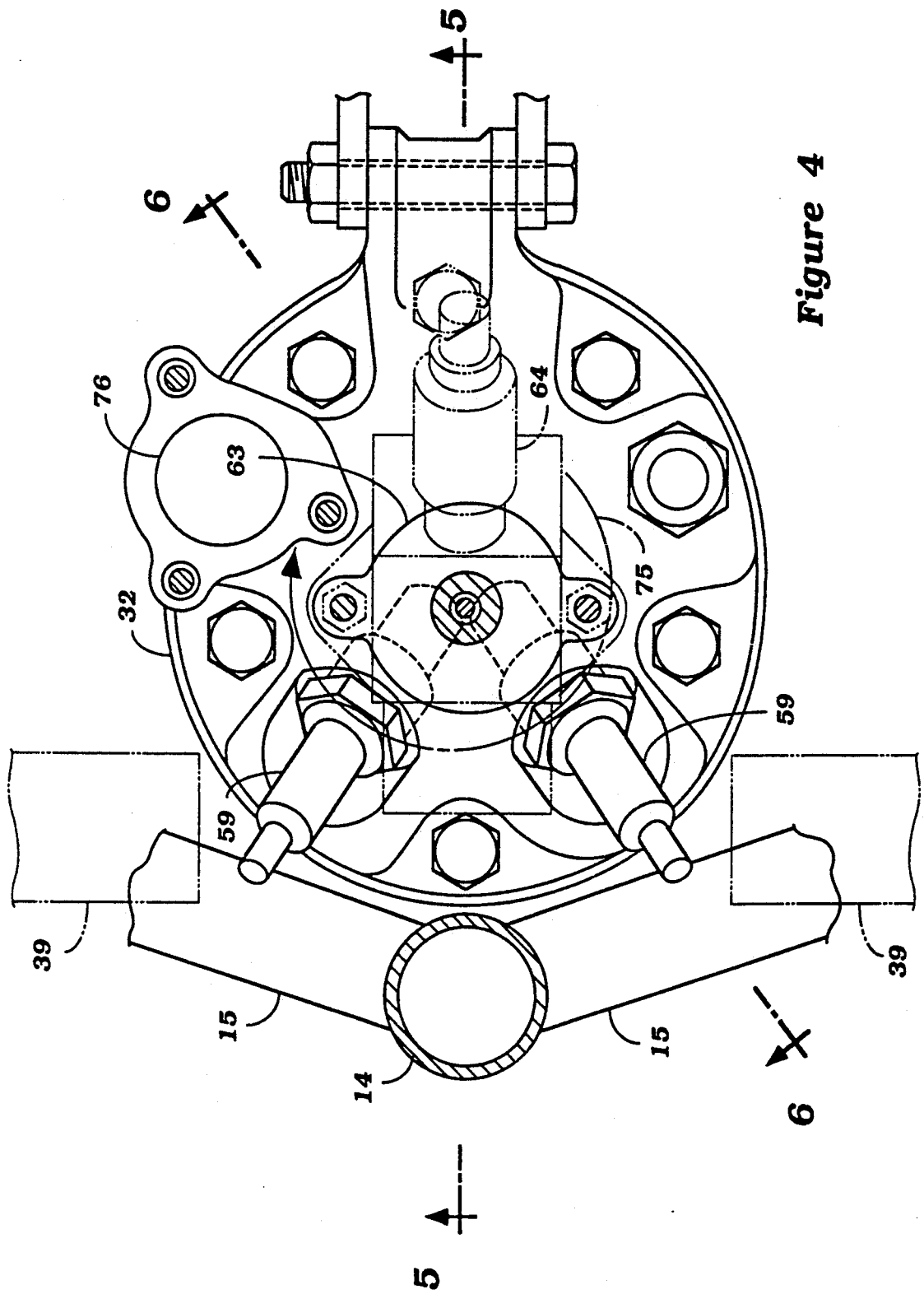
FIG. 4 is a further enlarged cross sectional view taken along the line 4—4 of FIG. 3.

The charge which has been admitted to the crankcase chamber is compressed and then transferred through one or more scavenge passages 57 to a combustion chamber 58 formed by the cylinder bore 48, head of the piston 49 and a recess formed in the cylinder head assembly 32. Fuel is mixed with the air, in a manner to be described, and is then fired by means of a pair of spark plugs 59 that are mounted in the cylinder head 32 in a relationship as best shown in FIGS. 2 and 4. It should be noted that the spark plugs 59 are inclined forwardly and are spaced circumferentially apart so as to be positioned between the radiators 39 and thus subjected to the cooling air flow which flows across the engine 28 from a forward to rearward direction, as should be readily apparent. As a result, the spark plugs 59 will be well cooled and the flow of air across them will not be obstructed by any other component of the engine 28.

The burned charge is discharged through an exhaust port 61 formed in the forward side of the cylinder block 31 and which communicates with the exhaust pipe 43 in a known manner. An exhaust control valve 62 may be positioned in the exhaust port 61 for controlling the timing at which the exhaust port 61 opens in response to engine load or engine speed.

As has been noted, fuel for the engine 28 is supplied from the fuel tank 48. A portion of the fuel is supplied directly to the combustion chamber 58 by a fuel/air injector assembly, indicated generally by the reference numeral 63, which is mounted centrally in the cylinder head 32 and between the spark plugs 59. As a result of this location, air may freely flow across the fuel/air injector 63 without interference from the spark plugs 59 and with each of these components being disposed so that no air disruption will occur and each will be adequately air cooled.

The fuel/air injector 63 may be of any known type and receives air under pressure, in a manner to be described, and fuel from a fuel injector 64 that is mounted to the fuel/air injector 63 and which extends in a rearward direction therefrom as best shown in FIGS. 3 and 4. The fuel/air injector 63 includes a chamber to which the compressed air is delivered and also a chamber to which fuel is delivered by the fuel injector 64. This fuel and air is then delivered to the combustion chamber 58 upon the opening of an injection valve.

A reciprocating type of air compressor, indicated generally by the reference numeral 65 is driven from the engine 28 in an appropriate manner and delivers air under pressure to an air manifold 66 which forms a part of the air/fuel injector 63. In addition, a high pressure fuel pump, indicated by the reference numeral 67 is also driven by the engine and delivers fuel to the fuel injector 64. The drive for the air compressor 65 and fuel pump 67 may be of the type shown in co-pending application entitled "Injection Pump Drive for Engine," Ser. No. 742,420, filed Aug. 8, 1991, in the names of Norihisa Mochizuki and Toshio Kinoshita and assigned to the assignee hereof. Of course, other types of air and fuel systems may be employed.

If all of the fuel supply to the engine 28 is supplied by the air/fuel injector 63, it has been found that starting may be difficult. In addition, there may be inadequate cooling of the engine and particularly the under side of the piston 49 and components associated with the crankcase 33 under high speed, high load conditions. Therefore, there is provided an auxiliary fuel injector 68 that is mounted in the intake manifold 42 and which sprays fuel thereinto downstream of the throttle 54 and immediately upstream of the reed type check valve 56. The injector 68 may inject pure fuel or may also be a fuel/air injector, if desired.

A control system (not illustrated) is provided for controlling the amounts of fuel delivered by the fuel/air injector 63 and the amount of fuel delivered by the fuel injector 68 and also the timing when each injector 63, 68 supplies fuel. In accordance with a preferred timing strategy, means are provided that are responsive to the starting of the engine to insure that all starting fuel is supplied only by the fuel injector 68. When the engine then begins running and operating at low and low medium mid-range performance, the fuel injector 68 supplies no fuel and all of the fuel requirements for the engine are supplied by the fuel injector 64 of the fuel/air injector assembly 63. As the engine moves into high load, high speed conditions from the upper mid-range, then the control has the fuel injector 68 inject fuel. In one preferred form of strategy, the amount of fuel injected by the fuel injector 64 of the fuel/air injector 63 is held constant at this high load condition and additional fuel is supplied by the fuel injector 68 so as to achieve the desired power output and speed. Of course, various other strategies may be employed. It is important to the invention, however, that the fuel injector 68 supplies the only fuel for starting and fuel only during the high speed, high load running conditions.

As has been noted, the engine 28 is liquid cooled and heat is exchanged by a pair of side mounted radiators 39. Coolant is delivered from the radiators 39 through a conduit 71 to a coolant pump 69 (FIG. 3) that is driven from the crankshaft 53. This coolant is then discharged into a cylinder block cooling jacket 72 for circulation generally in the direction indicated by the arrows in certain of the figures, and particularly FIGS. 3, 5 and 6. The coolant flows around the cylinder bore 49 and enters a cylinder head cooling jacket 73 through ports 74 formed in the upper portion of the cylinder block 31. The ports 74 are designed primarily so as to create a generally circular flow of coolant around the cylinder head 32 as indicated by the phantom line 75 in FIG. 4 so as to pass first adjacent the air/fuel injector 63, then the spark plugs 59 and exit the cylinder head 32 through an outlet port 76 that communicates with a thermostat housing 77 in which a thermostat is positioned so as to maintain a uniform and desired temperature for the engine. This water is then returned to the radiators 39 through return pipes 78.

It should be readily apparent from the foregoing description that the described construction is effective in permitting the placement of both multiple spark plugs and a fuel injector in the cylinder head of an engine without the components interfering with the air flow across each other to promote good cooling. Of course, the foregoing description is that of a preferred embodiment of the invention and various changes and modifications may be made without departing from the spirit and scope of the invention, as defined by the appended claims.

I claim:

1. A water cooled internal combustion engine for powering a motor vehicle having an engine area in which said engine is positioned and through which air flows in a normal direction, said engine having a cylinder head, a park plug mounted in said cylinder head for firing a charge in a combustion chamber of said engine, a fuel injector mounted in said cylinder head for delivering fuel to said combustion chamber, said fuel injector and said spark plug being mounted so that the air flowing through said engine area passes unobstructedly across each of said spark plug and said fuel injector without the flow across one interfering with the flow across the other, and a radiator for exchanging heat from the water coolant of said engine to the atmosphere and disposed at about the same vertical height as and to one side of said spark plug and fuel injector in the direction of air flow.

2. An internal combustion engine as set forth in claim 1 wherein the flow direction of air across the cylinder head is linear and the spark plug and fuel injector are not positioned in line with each other.

3. An internal combustion engine as set forth in claim 1 further including a second spark plug mounted in the cylinder head and positioned so that the air flowing through the engine area passes unobstructedly also across the second spark plug without interference with the flow across the other spark plug or the fuel injector.

4. An internal combustion engine as set forth in claim 3 wherein the flow direction of air across the cylinder head is linear and the spark plugs and fuel injector are not positioned in line with each other.

5. An internal combustion engine as set forth in claim 1 wherein the engine is disposed so that the cylinder head is inclined forwardly toward the direction of air flow.

6. An internal combustion engine as set forth in claim 5 wherein the flow direction of air across the cylinder head in linear and the spark plug and fuel injector are not positioned in line with each other.

7. An internal combustion engine as set forth in claim 5 further including a second spark plug mounted in the cylinder head and positioned so that the air flowing through the engine area passes unobstructedly also across the second spark plug without interference with the flow across the other spark plug or the fuel injector.

8. An internal combustion as set forth in claim 7 wherein the flow direction of air across the cylinder head in linear and the spark plugs and fuel injector are not positioned in line with each other.

9. An internal combustion engine as set forth in claim 1 wherein the coolant flow through the cylinder head is directed to enter around the fuel injector and flow in a circular pattern past the spark plug for exit from the cylinder head.

10. An internal combustion engine as set forth in claim 1 wherein the motor vehicle comprises a motorcycle having an open frame in which the engine area is defined.

11. An internal combustion engine as set forth in claim 10 wherein the flow direction of air across the cylinder head is linear and the spark plug and fuel injector are not positioned in line with each other.

12. An internal combustion engine as set forth in claim 10 further including a second spark plug mounted in the cylinder head and positioned so that the air flowing through the engine area passes unobstructedly also across the second spark plug without interference with the flow across the other spark plug or the fuel injector.

13. An internal combustion engine as set for the in claim 12 wherein the flow direction of air across the cylinder head is linear and the spark plugs and fuel injector are not positioned in line with each other.

14. An internal combustion engine as set forth in claim 10 wherein the engine is disposed so that the cylinder head is inclined forwardly in the frame and toward the direction of air flow.

15. An internal combustion engine as set forth in claim 14 wherein the flow direction of air across the cylinder head is linear and the spark plug and fuel injector are not positioned in line with each other.

16. An internal combustion engine as set forth in claim 14 further including a second spark plug mounted in the cylinder head and positioned so that the air flowing through the engine area passes unobstructedly also across the second spark plug without interference with the flow across the other spark plug or the fuel injector.

17. An internal combustion engine as set forth in claim 16 wherein the flow direction of air across the cylinder head is linear and the spark plugs and fuel injector are not positioned in line with each other.

18. An internal combustion engine as set forth in claim 10 wherein the coolant flow through the cylinder head is directed to enter around the fuel injector and flow in a circular pattern past the spark plug for exit from the cylinder head.

* * * * *